(12) United States Patent
Kumar (10) Patent No.: US 11,087,770 B2
(45) Date of Patent: Aug. 10, 2021

(54) DISPUTE INITIATION USING ARTIFICIAL INTELLIGENCE

(71) Applicant: American Express Travel Related Services Company, Inc., New York, NY (US)

(72) Inventor: Aruun Kumar Kumar, Plantation, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 184 days.

(21) Appl. No.: 16/026,339

(22) Filed: Jul. 3, 2018

(65) Prior Publication Data

US 2020/0013411 A1    Jan. 9, 2020

(51) Int. Cl.
| | | |
|---|---|---|
| *G10L 17/24* | (2013.01) | |
| *G06N 5/04* | (2006.01) | |
| *G06Q 30/00* | (2012.01) | |
| *G10L 17/00* | (2013.01) | |
| *G06N 20/00* | (2019.01) | |

(52) U.S. Cl.
CPC .............. *G10L 17/24* (2013.01); *G06N 5/046* (2013.01); *G06Q 30/016* (2013.01); *G10L 17/00* (2013.01); *G06N 20/00* (2019.01)

(58) Field of Classification Search
CPC ....... G10L 17/24; G10L 17/005; G06N 5/046; G06N 20/00; G06Q 30/016
See application file for complete search history.

(56) References Cited

U.S. PATENT DOCUMENTS

| | | | |
|---|---|---|---|
| 10,452,251 B2* | 10/2019 | Yaseen | ................... G10L 15/063 |
| 2007/0009870 A1* | 1/2007 | Kallander | ................ G09B 7/06 434/350 |
| 2014/0297268 A1* | 10/2014 | Govrin | ..................... G06N 5/04 704/9 |
| 2016/0180438 A1* | 6/2016 | Boston | ............... G06Q 30/0282 705/26.7 |
| 2017/0206241 A1* | 7/2017 | Beller | ................... G06F 3/0482 |
| 2019/0005590 A1* | 1/2019 | Li | .......................... G06Q 40/12 |

* cited by examiner

*Primary Examiner* — Michelle M Koeth
(74) *Attorney, Agent, or Firm* — Thomas | Horstemeyer, LLP (57) ABSTRACT

A system for artificial intelligent dispute resolution is disclosed. The system may receive a dispute initiation request from a voice input channel. The system may determine user authentication state in response to the dispute initiation request. The system may receive a natural language problem statement from the voice input channel. The system may determine a user intent in response to the natural language problem statement. The system may compare the user intent with a business rules set and determine a dispositioned outcome based on the business rules set and the user intent.

17 Claims, 3 Drawing Sheets

DISPUTE INITIATION USING ARTIFICIAL INTELLIGENCE

FIELD

The present disclosure generally relates to systems and methods for automating dispute resolution systems.

BACKGROUND

Traditional methods of automated inquiry and dispute resolution tend to employ decision tree structures. The decision tree structures often direct a user down a branching path comprising multiple levels defined by a filtering statement or question set, with each subsequent level narrowing the general inquiry to a particular problem statement. A user may select from one or more answer choices at each level adding information to define the nature of the problem. Improper or faulty selection of an answer choice may to result in an incorrect problem statement and may require the user to reset to the highest level of the decision tree. In this regard, defining a problem by traditional decision tree methods is usually time consuming, demand a relatively large number of user inputs, and may be intolerant of informational faults.

SUMMARY

In various embodiments, systems, methods, and articles of manufacture (collectively, the "system") for dispute resolution are disclosed. The system may receive a dispute initiation request from a voice input channel. The dispute initiation request may be received by a computer based system in communication with a database. The system may determine a user authentication state in response to the dispute initiation request. The system may receive a natural language problem statement from the voice input channel. The system may determine a user intent in response to the natural language problem statement. The system may compare the user intent with a business rules set and determine a dispositioned outcome based on the business rules set and the user intent. The system may return the dispositioned outcome and may store the dispositioned outcome as customer data.

In various embodiments, the system may invoke a user authentication process and prompt the voice input channel for an authentication data input, the system may receive an authentication data and compare the authentication data to the customer data, and the system may return a failed authentication message or a valid authentication message in response to the user authentication state. In various embodiments, the system transmits a request for natural language input in response to the valid authentication message. In various embodiments, the system may parse the natural language problem statement into a plurality of intent elements and store the plurality of intent elements as intent data. In various embodiments, the system may also request a first question and corresponding first answer array, the system may parse the first question and corresponding first answer array and generate a first parsed answer array, the system may also determine an answer availability in response to the first parsed answer array and a comparison function between the first parsed answer array and the plurality of intent elements.

In various embodiments, the system may also select a first answer in response to the answer availability, or pass the first question and corresponding first answer array to the voice input channel and receive the first answer the voice input channel. In various embodiments, the system may also receive a second question and corresponding second answer array in response to the first answer. In various embodiments, the system may also parse the second question and corresponding second answer array and generate a second parsed answer array, the system may also determine the answer availability in response to the second parsed answer array and the comparison function between the second parsed answer array and the plurality of intent elements, the system may also select a second answer in response to the answer availability, or pass the second question and corresponding second answer array to the voice input channel and receive the second answer from the voice input channel. In various embodiments, the system may also receive a third question and corresponding third answer array in response to the second answer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide a greater level of sophistication and control for dispute resolution systems. While prior art systems typically tend to demand multiple user inputs to define a problem, the current system may define a problem statement on the basis of a single natural language input (or minimal inputs) comprising a user intent. In this regard, the system may also reduce the cost of development or system processing time for problem definition by reducing input volume and not requiring additional hardware development or demanding additional information flow. The system may reduce the process time an automated dispute resolution process is engaged by a user. The system may also reduce redundant input requests, thereby reducing a demand for system resources. The system may simplify reconciliation disputes and enhance user experience by decreasing a number of user interactions. Benefits of the present disclosure may apply to any suitable use of branching definition trees. For example, the present disclosure may apply in dispute contexts, as well as in information requests or support contexts.

This process improves the functioning of the computer. For example, the process increases the reliability and speed of dispute processing by reducing a number of user inputs and/or bypassing a number of user input requests. In various embodiments, reducing the number of user inputs decreases the number of cases where a dispute is abandoned. In this regard, by reducing a number of abandoned dispute cases network calls are reduced for revived cases and storage overhead for abandoned cases is reduced. In this regard, the processes described herein may decrease processing overhead of computing systems comprising artificial intelligent dispute preprocessors. In various embodiments, the processes described herein may increase network availability by tending to reduce front end and back end process calls and/or network hops. In this regard, the processes described herein may save processing resources including CPU time, memory resources, and network resources.

Figure 1:
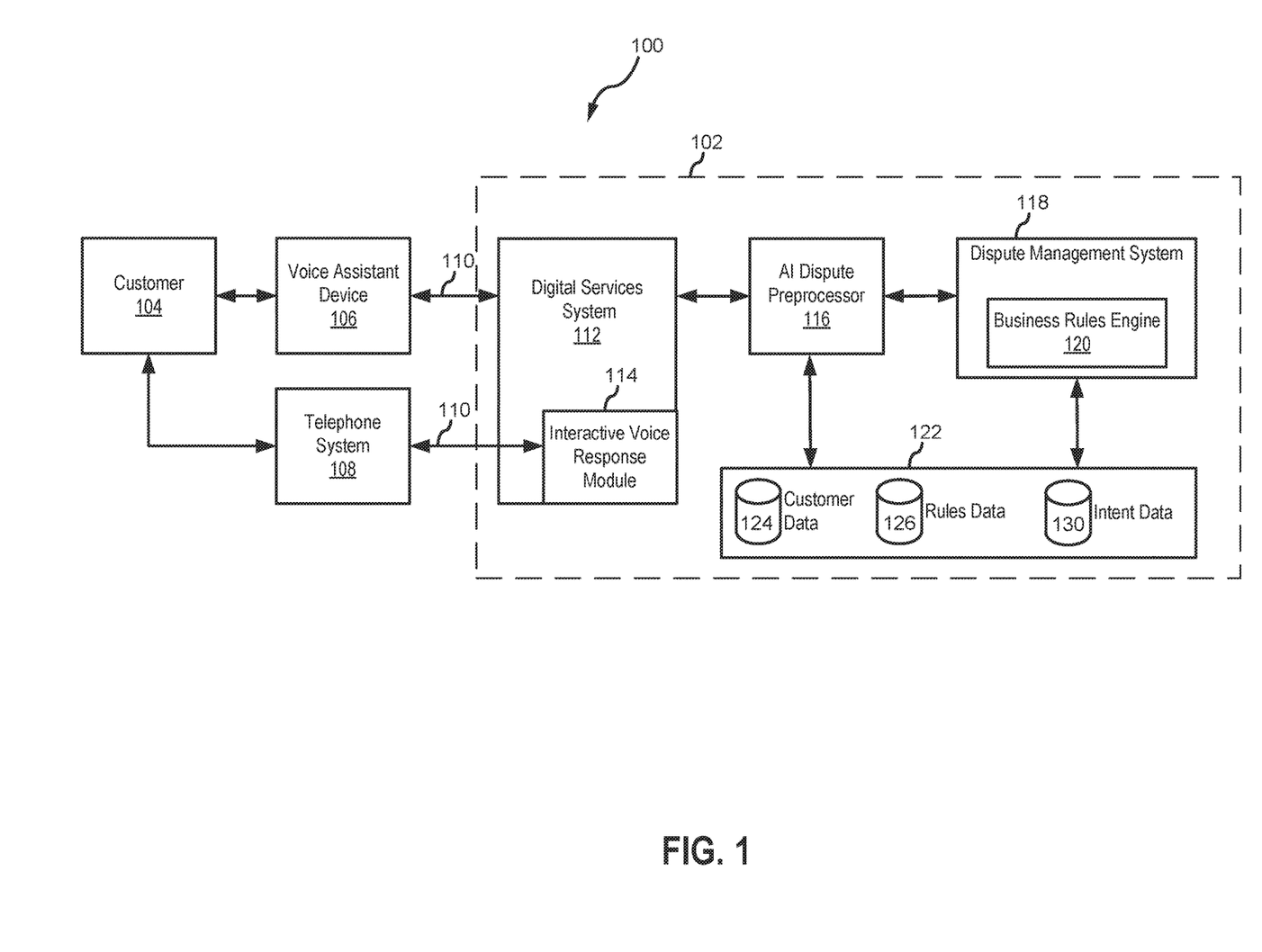
FIG. 1 is a block diagram illustrating various system components of a system for automated dispute resolution, in accordance with various embodiments.

In various embodiments, and with reference to FIG. 1, a system 100 may comprise an issuer system 102, a customer 104 (e.g., a user), a Voice Assistant (VA) device 106, and a telephone system 108. In various embodiments, issuer system 102 may further comprise a Digital Services System (DSS) 112 which may comprise an Interactive Voice Response (IVR) module 114, an Artificial Intelligent (AI) dispute preprocessor 116, a dispute management system 118 which may comprise a Business Rules Engine (BRE) 120, and a database 122. Any of these components may be outsourced and/or be in communication with issuer system 102.

In various embodiments, database 122 may comprise any number of data elements or data structures such as customer data 124, rules data 126, and intent data 130. VA device 106 may comprise software and/or hardware in communication with issuer system 102 via network 110. In various embodiments, telephone system 108 may be in communication with issuer system 102 via network 110. In various embodiments, network 110 may comprise hardware and/or software configured to allow customer 104, a prospective customer, a transaction account owner, a user, and/or the like, access to issuer system 102. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, VA device 106 may comprise hardware and/or software configured to allow customer 104, a user, a prospective customer, transaction account owner, and/or the like, access to system 100. For example, VA device 106 may comprise any suitable device that is configured to allow a user to communicate with a network and issuer system 102 via network 110. VA device 106 may include, for example, a personal computer, personal digital assistant, cellular phone, kiosk, virtual assistants (e.g., Amazon Echo, Google Home, Apple HomePod, etc.) and/or the like comprising a voice recognition function. VA device 106 may allow a user to communicate with issuer system 102 to input elements of customer data 124 and intent data 130, receive and communicate responses from system 102, and transmit a dispute initiation request or a natural language problem statement, and/or any other suitable task. VA device 106 and telephone system 108 may be in electronic and/or operative communication with issuer system 102. In this regard, VA device 106 may comprise any suitable hardware and/or software components capable of sending and receiving data, for example, a personal computer, personal digital assistant, cellular phone, kiosk, and/or the like. In various embodiments, VA device 106 or telephone system 108 may transmit a dispute initiation request or a natural language problem statement comprising a user intent to issuer system 102 via network 110.

In various embodiments, issuer system 102 may be configured as a central network element or hub to access various systems, engines, and components of system 100. Issuer system 102 may comprise a network, computer-based system, and/or software components configured to provide an access point to various systems, engines, and components. Issuer system 102 may be in operative and/or electronic communication with VA device 106, telephone system 108, DSS 112, IVR module 114, AI dispute preprocessor 116, dispute management system 118, BRE 120, and/or database 122. In this regard, issuer system 102 may allow communication from VA device 106 to systems, engines, and components of system 100. Issuer system 102 may also allow communication from telephone system 108 to systems, engines, and components of system 100. In various embodiments, issuer system 102 may receive device identity (e.g. fingerprinting) data from VA device 106. In various embodiments, device fingerprinting data may be stored as customer data 124.

In various embodiments, database 122 may be configured to store and maintain data relating to customer 104, such as authentication data 214, as customer data 124. For example, customer data 124 may comprise customer device information, customer interaction data and/or clickstream data, customer account data, customer identity data, and/or the like. Database 122 may store the customer data 124 using any suitable technique described herein or known in the art. Customer data 124 may be in operative and/or electronic communication with DSS 112, AI dispute preprocessor 116, dispute management system 118, IVR module 114, and/or BRE 120. In various embodiments, customer data 124 may be written to database 122 in response to determining a dispositioned outcome 262 as described in greater detail below.

In various embodiments, database 122 may be configured to store and maintain rules data 126 relating to business rules used by BRE 120 in prompting questions and corresponding answer arrays. Rules data 126 may comprise data such as questions, answer arrays, dispositioned outcomes, intent correlation arrays, and other data defining a decision tree structure. Database 122 may store the rules data 126 using any suitable technique described herein or known in the art. Rules data 126 may be in operative and/or electronic communication with DSS 112, AI dispute preprocessor 116, dispute management system 118, IVR module 114, and/or BRE 120.

In various embodiments, database 122 may be configured to store and maintain intent data 130. For example, a plurality of intent elements derived from a parsed natural language problem statement and/or other such similar data. Intent data 130 may be stored in database 122 using any suitable technique described herein or known in the art. Intent data 130 may be in operative and/or electronic communication with DSS 112, AI dispute preprocessor 116, dispute management system 118, IVR module 114, and/or BRE 120 and may be associated with customer data 124. In various embodiments, intent data 130 may be written to database 122 in response to parsing a natural language problem statement.

Figure 2A:
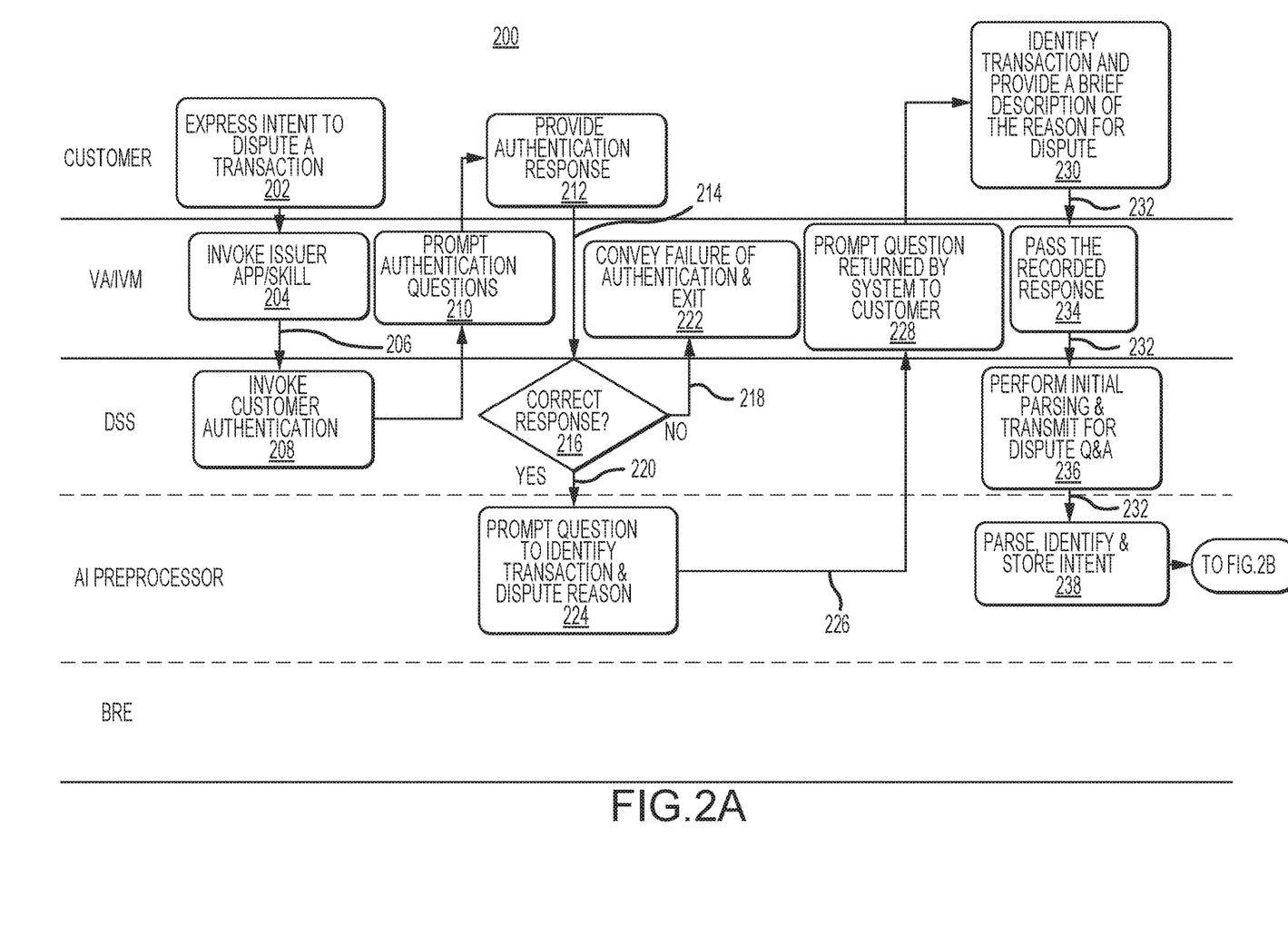
FIG. 2A illustrates a process flow for automated dispute resolution, in accordance with various embodiments.
Figure 2B:
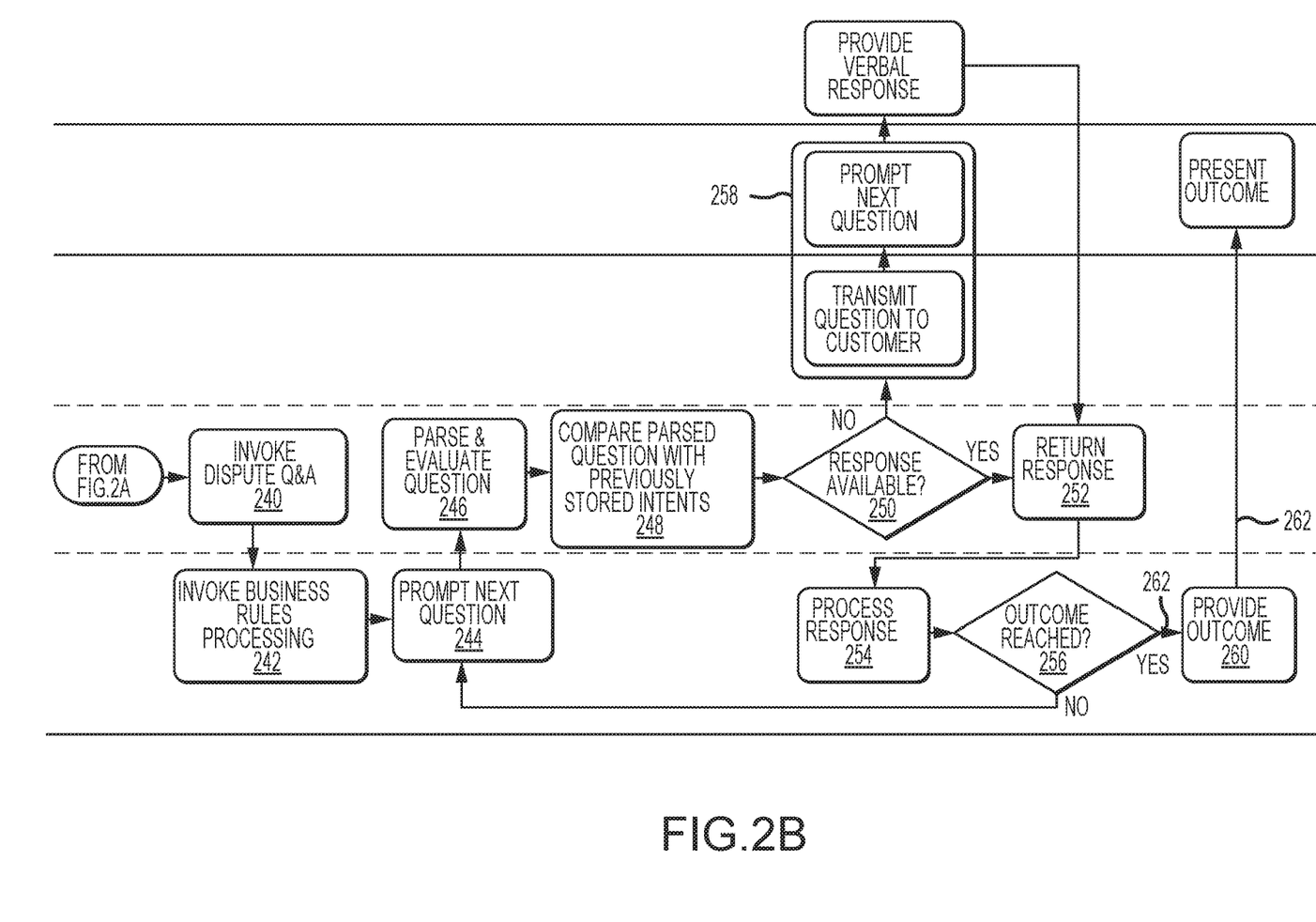
FIG. 2B illustrates a continued process flow for automated dispute resolution, in accordance with various embodiments.

In various embodiments, and with additional reference to FIGS. 2A and 2B, customer 104 may express an intent to dispute a transaction (step 202) through VA device 106 or telephone system 108 which, respectively, may be captured by the voice recognition function VA device 106 or IVR module 114 as a dispute initiation request 206. In this regard, VA device 106 or telephone system 108 and IVR module 114 may define a voice input channel of system 100. VA device 106 or IVR module 114 may be configured to invoke an issuer application or skill (step 204) to generate the dispute initiation request 206 in response to the intent to dispute a transaction. For example, the dispute initiation request 206 may be generated in response to customer 104 speaking "I wish to dispute a transaction" or selecting a dispute option from an options menu.

The DSS may determine a user authentication state in response to receiving dispute initiation request 206 from the VA device 106 or the IVR module 114. Determining the user authentication state may include the DSS 112 invoking a customer authentication process (step 208). DSS 112 may be configured to prompt the VA device 106 or the IVR module 114 for an authentication data input which, in turn, may present an authentication question to customer 104 (step 210). The DSS may receive authentication data 214 and may be configured to compare the authentication data 214 with customer data 124 to determine the authentication state (step 216). The customer may be authenticated where the authentication data 214 matches customer data 124. DSS 112 may transmit a valid authentication message 220 to the AI dispute preprocessor 116. In various embodiments, the customer may fail authentication where the authentication data 214 does not match customer data 124. DSS 112 may transmit a failed authentication message 218 to the VA device 106 or IVR module 114. In various embodiments, VA device 106 or IVR module 114 may convey the failed authentication message 218 to customer 104 and may close the issuer application or skill, close connections with network 110, and/or otherwise exit the dispute process (step 222).

In various embodiments, in response to the valid authentication message 220, the AI dispute preprocessor 116 may generate a question prompt to identify a transaction and a dispute reason related to the transaction and may transmit the prompt as a request for natural language input 226 (step 224). VA device 106 or IVR module 114 may present the request for natural language input 226 to the customer 104. In various embodiments, customer 104 may generate a natural language problem statement 232 (step 230) which may be passed to DSS 112 and AI dispute preprocessor 116 via VA device 106 or IVR module 114 (step 234). Customer 104 may generate a natural langue problem statement by speaking, in natural voice, a brief definition of the dispute such as, for example, "I cancelled my cable subscription on October 10 but I was still billed." In this regard, the natural language problem statement may be relatively arbitrary with respect to the phraseology for any customer but may contain a user intent with respect to the dispute. The DSS 112 may perform an initial parsing of the natural language problem statement 232 and may transmit the parsed problem statement for analysis via dispute question and answer sets (step 236). In various embodiments, the AI dispute preprocessor 116 may determine a user intent in response to the natural language problem statement 232. In various embodiments, the AI dispute preprocessor 116 may parse the natural language problem statement and/or determine the user intent via natural language processing algorithm and/or one developed by a machine learning technique such as, for example, one of a supervised deep learning technique or an unsupervised deep learning technique applied to the natural language problem statement 232.

Determining the user intent may comprise AI dispute preprocessor 116 parsing the natural language problem statement 232 into a plurality of intent elements which may be stored by database 122 as intent data 130 defining the user intent (step 238). For example, in response to a natural language problem statement such as "I cancelled my cable subscription on October 10 but I was still billed," AI dispute preprocessor 116 may define an array of intent elements for "cancelled", "subscription", "cable", and/or "October 10". The intent elements may be selected as a function of the business rules or an intent correlation array comprising phraseology correlated with a particularized intent. In various embodiments, AI dispute preprocessor 116 may invoke a dispute question and answer (Q&A) process (step 240) which may start BRE 120 of dispute management system 118 (step 242). In various embodiments, AI dispute preprocessor 116 may invoke the dispute Q&A process by requesting a first question and corresponding first answer array from the BRE 120.

In various embodiments, each question and answer set may comprise a single question and a corresponding array of answers (i.e. a corresponding set of answer choices), wherein each question and answer array are predefined in accordance with a decision tree structure (e.g., a set of business rules) which may govern a related dispute Q&A process flow. As will be appreciated, the decision tree comprises branches comprising multiple levels defined by a plurality of questions with each of the plurality of questions having a corresponding answer array. Each subsequent level is defined by links between answers of the answer arrays from the lower level to one of the question and corresponding answer array of the higher level or a dispositioned outcome 262. In this regard, the dispositioned outcome 262 defines the terminus of the branching path of links followed based on answers selected from corresponding answer arrays and may represent a solution to the natural language problem statement which may vary as a function of the business rules set. The set of business rules may be stored in database 122 as rules data 126. As will be appreciated, an answer array may comprise a single objective response element such as, for example, a calendar date. For example, the system may present a question comprising a request for a transaction date and a customer may input the calendar date as the objective response element.

In various embodiments, the BRE 120 may pass a first question and corresponding first answer array to the AI dispute preprocessor (step 244). The AI dispute preprocessor 116 may parse the first question and corresponding first answer array to generate a first parsed answer array (step 246). In various embodiments, the AI dispute preprocessor 116 may compare the plurality of intent elements stored as intent data 130 with the first parsed answer array (step 248). Based on a comparison function of the first parsed answer array and the plurality of intent elements, the AI dispute preprocessor 116 may determine an answer availability (step 250). For example, AI dispute preprocessor may determine an available answer where there is correlation between the plurality of intent elements and an answer choice of the first parsed answer array exceeding a correlation threshold. When the AI dispute preprocessor 116 determines an answer is available, the AI dispute preprocessor 116 may select a first answer from the first answer array and pass the first answer to the BRE 120 (step 252). The system may determine the correlation and make the answer selection based on comparison algorithms developed by a machine learning technique such as, for example, one of a supervised deep learning technique or an unsupervised deep learning technique or a reinforcement technique. When the AI dispute preprocessor 116 determines an answer is not available, the AI dispute preprocessor 116 may pass the first question and corresponding first answer array to the DSS 112 for presentation to the customer 104. In this regard, the customer 104 may select the first answer which may be received by the DSS 112 and passed to the AI dispute preprocessor 116 (step 258).

In either case and in response to receiving the first answer, the BRE 120 may process the first answer (step 254) and determine (based on the business rules set) whether a dispositioned outcome 262 is reached (step 256). In other words, the BRE may determine if the first answer is linked to the dispositioned outcome 262 or branches to another question (e.g., a second question). When the answer branches to another question, the BRE 120 returns to prompt the next question (step 244). In this regard, in response to the first answer, the BRE may pass a second question and corresponding second answer array to the AI dispute preprocessor 116. The AI dispute preprocessor 116 may parse the second question and corresponding second answer array and generate a second parsed answer array (step 246). In various embodiments, the AI dispute preprocessor 116 may compare the plurality of intent elements stored as intent data 130 with the second parsed answer array (step 248) and, based on a function of the second parsed answer array and the plurality of intent elements, may determine the answer availability (step 250).

When the AI dispute preprocessor 116 determines the answer is available, the AI dispute preprocessor 116 may select a second answer from the second answer array and pass the second answer to the BRE 120 (step 252). When the AI dispute preprocessor 116 determines the answer is not available, the AI dispute preprocessor 116 may pass the second question and corresponding second answer array to the DSS 112 for presentation to the customer 104 and, in this regard, the customer 104 may select the second answer which may be received by the DSS 112 and passed to the AI dispute preprocessor 116 (step 258). As above and with regards to step 254 and step 256 the BRE 120 may process the second answer and determine based on the business rules set whether the dispositioned outcome 262 is reached. In this regard, the system may iterate through any number of branching question and corresponding answer arrays defined by the business rules set (e.g., a third question and corresponding third answer array, a fourth question and corresponding fourth answer array . . . an Nth question and corresponding Nth answer array) until the BRE 120 determines the dispositioned outcome 262 is reached. In various embodiments, when the dispositioned outcome 262 is reached the BRE 120 may then provide the dispositioned outcome 262 for presentation to the customer 104 and store the dispositioned outcome 262 as customer data 124 (step 260) and the process depicted in FIGS. 2A and 2B for is complete for the given dispute initiation request 206.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit," "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2A and 2B the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2A and 2B, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000." The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "transaction account," "financial transaction instrument," "transaction instrument" and/or the plural form of these terms may be used interchangeably throughout to refer to a financial instrument. Phrases and terms similar to "transaction account" may include any account that may be used to facilitate a financial transaction.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP")

address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

What is claimed is:

1. A method, comprising:
   receiving, by a computer based system, a natural language problem statement from a voice input channel;
   determining, by the computer based system, a user intent in response to the natural language problem statement, wherein the determining the user intent further comprises:
      parsing, by the computer based system, the natural language problem statement into a plurality of intent elements that are correlated with the determined user intent; and
      storing, by the computer based system, the plurality of intent elements as intent data;
   executing a question and answer process having multiple levels defined by a plurality of questions and corresponding answer arrays;
   at individual ones of the multiple levels of the question and answer process, comparing the plurality of intent elements that are correlated with the determined user intent with an answer array for a current level and a question for the current level of the question and answer process, wherein, at the individual ones of the multiple levels of the question and answer process, an answer is selected, by the computer based system, from the answer array before progressing to a next level of the question and answer process based on a determination of one of the plurality of intent elements corresponding to the selected answer, wherein the question and the answer array for the current level are presented over the voice input channel to a user, by the computer based system, when none of the plurality of intent elements that are correlated with the determined user intent are determined, by the computer based system, to correspond to available answers in the answer array for the current level, and wherein the user is prompted, by the computer based system, to select one of the available answers in the answer array before moving to the next level of the question and answer process when none of the plurality of intent elements that are correlated with the determined user intent are determined, by the computer based system, to correspond to the available answers in the answer array for the current level;
   completing, by the computer based system, the question and answer process until a dispositioned outcome is determined; and
   returning, by the computer based system, the dispositioned outcome and storing, by the computer based system, the dispositioned outcome as a customer data.

2. The method of claim 1, further comprising determining, by the computer based system, a user authentication state in response to a dispute initiation request, wherein the determining the user authentication state comprises:
   invoking, by the computer based system, a user authentication process and prompting the voice input channel for an authentication data input;
   receiving, by the computer based system, an authentication data and comparing, by the computer based system, the authentication data to the customer data; and
   returning, by the computer based system and in response to the user authentication state, a failed authentication message or a valid authentication message.

3. The method of claim 1, wherein the computer based system transmits a request for natural language input in response to a valid authentication message.

4. The method of claim 1, further comprising:
   requesting, by the computer based system, a first question and corresponding first answer array at a first level of the question and answer process;
   parsing, by the computer based system, the first question and corresponding first answer array and generating a first parsed answer array; and
   determining, by the computer based system, an answer availability in response to the first parsed answer array and a comparison function between the first parsed answer array and the plurality of intent elements.

5. The method of claim 4, further comprising:
   either selecting, by the computer based system, a first answer in response to the answer availability or passing, by the computer based system, the first question and corresponding first answer array to the voice input channel and receiving the first answer from the voice input channel; and receiving, by the computer based system, a second question and corresponding second answer array at a second level of the question and answer process in response to the first answer.

6. The method of claim 5, further comprising:

parsing, by the computer based system, the second question and corresponding second answer array and generating a second parsed answer array;

determining, by the computer based system, the answer availability in response to the second parsed answer array and the comparison function between the second parsed answer array and the plurality of intent elements;

selecting, by the computer based system, a second answer in response to the answer availability; or passing, by the computer based system, the second question and corresponding second answer array to the voice input channel and receiving the second answer from the voice input channel; and receiving, by the computer based system, a third question and corresponding third answer array at a third level of the question and answer process in response to the second answer.

7. A system comprising:

a processor; and a tangible, non-transitory memory configured to communicate with the processor, the tangible, non-transitory memory having instructions stored thereon that, in response to execution by the processor, cause the processor to perform operations comprising:

receiving a natural language problem statement from a voice input channel;

determining a user intent in response to the natural language problem statement, wherein the determining the user intent further comprises:

parsing the natural language problem statement into a plurality of intent elements that are correlated with the determined user intent; and storing the plurality of intent elements as intent data;

executing a question and answer process having multiple levels defined by a plurality of questions and corresponding answer arrays;

at individual ones of the multiple levels of the question and answer process, comparing the plurality of intent elements that are correlated with the determined user intent with an answer array for a current level and a question for the current level of the question and answer process, wherein, at the individual ones of the multiple levels of the question and answer process, an answer is selected, by the processor, from the answer array before progressing to a next level of the question and answer process based on a determination of one of the plurality of intent elements corresponding one of the plurality of intent elements corresponding to the selected answer, wherein the question and the answer array for the current level are presented over the voice input channel to a user, by the processor, when none of the plurality of intent elements that are correlated with the determined user intent are determined, by the processor, to correspond to available answers in the answer array for the current level, and wherein the user is prompted, by the processor, to select one of the available answers in the answer array before moving to the next level of the question and answer process when none of the plurality of intent elements that are correlated with the determined user intent are determined, by the processor, to correspond to the available answers in the answer array for the current level;

completing the question and answer process until a dispositioned outcome is determined; and returning the dispositioned outcome and storing the dispositioned outcome as a customer data.

8. The system of claim 7, further comprising determining a user authentication state in response to a dispute initiation request, wherein the determining the user authentication state comprises:

invoking a user authentication process and prompting the voice input channel for an authentication data input;

receiving an authentication data and comparing, by the processor, the authentication data to the customer data; and returning in response to the user authentication state, a failed authentication message or a valid authentication message.

9. The system of claim 7, wherein the processor transmits a request for natural language input in response to a valid authentication message.

10. The system of claim 7, further comprising:

requesting a first question and corresponding first answer array at a first level of the question and answer process;

parsing the first question and corresponding first answer array and generating a first parsed answer array; and determining an answer availability in response to the first parsed answer array and a comparison function between the first parsed answer array and the plurality of intent elements.

11. The system of claim 10, further comprising:

either selecting a first answer in response to the answer availability or passing the first question and corresponding first answer array to the voice input channel and receiving the first answer from the voice input channel; and receiving a second question and corresponding second answer array at a second level of the question and answer process in response to the first answer.

12. The system of claim 11, further comprising:

parsing the second question and corresponding second answer array and generating a second parsed answer array;

determining the answer availability in response to the second parsed answer array and the comparison function between the second parsed answer array and the plurality of intent elements;

selecting a second answer in response to the answer availability; or passing the second question and corresponding second answer array to the voice input channel and receiving the second answer from the voice input channel; and receiving a third question and corresponding third answer array at a third level of the question and answer process in response to the second answer.

13. An article of manufacture including a non-transitory, tangible computer readable storage medium having instructions stored thereon that, in response to execution by a computer based system, cause the computer based system to perform operations comprising:

receiving a natural language problem statement from a voice input channel;

determining a user intent in response to the natural language problem statement, wherein the determining the user intent further comprises:
  parsing the natural language problem statement into a plurality of intent elements that are correlated with the determined user intent; and
  storing the plurality of intent elements as intent data;
executing a question and answer process having multiple levels defined by a plurality of questions and corresponding answer arrays;
at individual ones of the multiple levels of the question and answer process, comparing the plurality of intent elements that are correlated with the determined user intent with an answer array for a current level and a question for the current level of the question and answer process, wherein, at the individual ones of the multiple levels of the question and answer process, an answer is selected, by the computer based system, from the answer array before progressing to a next level of the question and answer process based on a determination of one of the plurality of intent elements corresponding to the selected answer, wherein the question and the answer array for the current level are presented over the voice input channel to a user, by the computer based system, when none of the plurality of intent elements that are correlated with the determined user intent are determined, by the computer based system, to correspond to available answers in the answer array for the current level, and wherein the user is prompted, by the computer based system, to select one of the available answers in the answer array before moving to the next level of the question and answer process when none of the plurality of intent elements that are correlated with the determined user intent are determined, by the computer based system, to correspond to the available answers in the answer array for the current level;
completing the question and answer process until a dispositioned outcome is determined; and
returning the dispositioned outcome and storing, by the computer based system, the dispositioned outcome as a customer data.

14. The article of manufacture of claim 13, wherein the operations further comprise determining a user authentication state in response to a dispute initiation request, wherein the determining the user authentication state comprises:
  invoking a user authentication process and prompting the voice input channel for an authentication data input;
  receiving an authentication data and comparing, by the computer based system, the authentication data to the customer data; and
  returning, in response to the user authentication state, a failed authentication message or a valid authentication message.

15. The article of manufacture of claim 13, wherein the operations further comprise transmitting a request for natural language input in response to a valid authentication message.

16. The article of manufacture of claim 13, wherein the operations further comprise:
  requesting a first question and corresponding first answer array at a first level of the question and answer process;
  parsing the first question and corresponding first answer array and generating a first parsed answer array; and
  determining an answer availability in response to the first parsed answer array and a comparison function between the first parsed answer array and the plurality of intent elements.

17. The article of manufacture of claim 16, wherein the operations further comprise:
  either selecting a first answer in response to the answer availability or passing the first question and corresponding first answer array to the voice input channel and receiving the first answer from the voice input channel; and
  receiving a second question and corresponding second answer array in a second level of the question and answer process in response to the first answer.

\* \* \* \* \*